(12) United States Patent
Qing

(10) Patent No.: US 9,620,033 B2
(45) Date of Patent: Apr. 11, 2017

(54) MAP

(75) Inventor: Cui Yang Qing, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 335 days.

(21) Appl. No.: 13/428,734

(22) Filed: Mar. 23, 2012

(65) Prior Publication Data

US 2013/0249951 A1    Sep. 26, 2013

(51) Int. Cl.
- *G09G 5/00* (2006.01)
- *G09B 29/10* (2006.01)
- *G01C 21/36* (2006.01)

(52) U.S. Cl.
CPC ....... *G09B 29/106* (2013.01); *G01C 21/3667* (2013.01)

(58) Field of Classification Search
USPC .......................................... 345/660
See application file for complete search history.

(56) References Cited

U.S. PATENT DOCUMENTS

| | | | | |
|---|---|---|---|---|
| 4,504,913 A * | 3/1985 | Miura | G01C 21/367 340/990 |
| 4,814,989 A * | 3/1989 | Dobereiner | G01C 21/30 340/988 |
| 5,638,523 A * | 6/1997 | Mullet et al. | 715/855 |
| 6,067,502 A * | 5/2000 | Hayashida | G01C 21/367 340/990 |
| 6,202,026 B1 * | 3/2001 | Nimura et al. | 701/455 |
| 6,392,661 B1 * | 5/2002 | Tankersley | 345/660 |
| 6,417,867 B1 * | 7/2002 | Hallberg | 345/660 |
| 6,847,888 B2 * | 1/2005 | Fox et al. | 340/995.15 |
| 6,868,336 B1 * | 3/2005 | Nakano | 701/455 |
| 6,999,875 B2 * | 2/2006 | Tu | 701/538 |
| 7,106,218 B2 * | 9/2006 | Kimura | 340/995.1 |
| 7,321,824 B1 | 1/2008 | Nesbitt | |
| 7,392,133 B2 * | 6/2008 | Maruyama et al. | 701/423 |

(Continued)

FOREIGN PATENT DOCUMENTS

| | | |
|---|---|---|
| EP | 1 901 038 A1 | 3/2008 |
| WO | WO 01/71485 A1 | 9/2001 |
| WO | WO 2006/128020 A2 | 11/2006 |

OTHER PUBLICATIONS

Plaisant, C. et al., *Image-Browser Taxonomy and Guidelines for Designers*, IEEE Software, institute of Electrical and Electronics Engineers, vol. 12, No. 2, (Mar. 1, 1995) pp. 21-32.

(Continued)

*Primary Examiner* — M Good Johnson
(74) *Attorney, Agent, or Firm* — Alston & Bird LLP

(57) ABSTRACT

An apparatus comprising at least one processor and at least one memory that are configured to cause the apparatus at least to perform: causing display, in a first display area of a display, of a first map that represents a first geographic area, at a first scale, including a first location and that highlights the first location, wherein the first scale is controlled so that the first geographic area includes the first location but does not include a second location; causing simultaneous display, in a second different display area of the display, of a second map that represents a second geographic area, at a second scale, including the second location and that highlights the second location, wherein the second scale is controlled so that the second geographic area includes the second location but does not include the first location.

18 Claims, 3 Drawing Sheets

(56) References Cited

U.S. PATENT DOCUMENTS

| | | | |
|---|---|---|---|
| 7,568,166 B2 | 7/2009 | Kato | |
| 7,844,395 B2* | 11/2010 | Aoyama | 701/432 |
| 8,031,206 B2* | 10/2011 | Shoemaker | 345/619 |
| 8,151,210 B2* | 4/2012 | Nezu et al. | 715/804 |
| 8,315,795 B2* | 11/2012 | Kikuchi | 701/428 |
| 8,468,464 B2* | 6/2013 | Abramson et al. | 715/804 |
| 8,577,877 B2* | 11/2013 | Bengtsson | G06F 17/30241 707/724 |
| 8,681,181 B2* | 3/2014 | Arrasvuori | G06T 3/0025 345/660 |
| 9,057,625 B2* | 6/2015 | Miura | G01C 21/3697 |
| 9,151,630 B2* | 10/2015 | Miura | G01C 21/3469 |
| 9,207,096 B2* | 12/2015 | Sartipi | G01C 21/367 |
| 2002/0188400 A1* | 12/2002 | Sato | G01C 21/3415 701/455 |
| 2003/0216860 A1* | 11/2003 | Shitamatsu et al. | 701/211 |
| 2004/0186662 A1* | 9/2004 | Morie | 701/208 |
| 2006/0174213 A1* | 8/2006 | Kato | G01C 21/367 715/800 |
| 2006/0178827 A1* | 8/2006 | Aoyama | 701/211 |
| 2006/0267803 A1* | 11/2006 | Mathis et al. | 340/995.15 |
| 2007/0078599 A1* | 4/2007 | Yoshioka | G01C 21/367 701/454 |
| 2008/0100591 A1* | 5/2008 | Nezu et al. | 345/173 |
| 2010/0082242 A1* | 4/2010 | Park | G01C 21/00 701/532 |
| 2010/0235085 A1* | 9/2010 | Kikuchi | 701/201 |
| 2011/0007074 A1* | 1/2011 | Sakashita | G01C 21/367 345/428 |
| 2011/0161861 A1* | 6/2011 | Abramson et al. | 715/781 |
| 2011/0187741 A1* | 8/2011 | Akiya et al. | 345/625 |
| 2011/0196610 A1* | 8/2011 | Waldman | G01C 21/3644 701/533 |
| 2013/0050269 A1* | 2/2013 | Arrasvuori | G06T 3/0025 345/661 |

OTHER PUBLICATIONS

International Search Report and Written Opinion for Application No. PCT/IB2013/052264 dated Sep. 6, 2013.

Agrawala, M. et al., *A Design and Implementation for Effective Computer-Generated Route Maps*, AAAI Symposium on Smart Graphics, X. XX, (Mar. 20, 2000) 5 pages.

Plaisant, C. et al., *Image-Browser Taxonomy and Guidelines for Designers*, IEEE Software, institute of Electrical and Electronics Engineers, vol. 12, No. 1, (Mar. 1, 1995) pp. 21-32.

* cited by examiner

MAP

TECHNOLOGICAL FIELD

Embodiments of the present invention relate to maps. In particular, they relate to controlling how a map is displayed on an apparatus.

BACKGROUND

It is now possible to store digital versions of maps. However, digital maps may often be viewed using an apparatus that has a fixed display size.

Therefore if multiple locations distributed over a large geographic area need to be displayed, the large geographic area is displayed at a large scale (small magnification).

BRIEF SUMMARY

According to various, but not necessarily all, embodiments of the invention there is provided an apparatus comprising: at least one processor; and at least one memory including computer program code the at least one memory and the computer program code configured to, with the at least one processor, cause the apparatus at least to perform: causing display, in a first display area of a display, of a first map that represents, at a first scale, a first geographic area including at least a first location and that highlights the first location, wherein the first scale is controlled so that the first geographic area includes the first location but does not include a second location; and causing simultaneous display, in a second different display area of the display, of a second map that represents, at a second scale, a second geographic area including at least the second location and that highlights the second location, wherein the second scale is controlled so that the second geographic area includes the second location but does not include the first location.

According to various, but not necessarily all, embodiments of the invention there is provided a method comprising: causing display, in a display, of a first map in a first display area wherein the first map displays a first geographic area at a first scale that includes at least a first location and highlights the first location, wherein the first scale is controlled so that the first geographic area includes the first location but does not include a second location; and causing simultaneous display, in the display, of a second map in a second display area wherein the second map displays at least a second geographic area at a second scale that includes the second location and highlights the second location, wherein the second scale is controlled so that the second geographic area includes the second location but does not include the first location.

According to various, but not necessarily all, embodiments of the invention there is provided an apparatus comprising: at least one processor; and at least one memory including computer program code the at least one memory and the computer program code configured to, with the at least one processor, cause the apparatus at least to perform causing display of a plurality of maps in a plurality of display areas in a display wherein each map displays, at a respective scale, a respective geographic area that includes a respective location and highlights the respective location, wherein the respective scales of the plurality of display areas are controlled so that none of the plurality of respective geographic areas includes a whole of any other of the plurality of respective geographic areas.

According to various, but not necessarily all, embodiments of the invention there is provided a computer program product that when run on a processor enables the processor to cause display, in a display, of a first map in a first display area wherein the first map displays a first geographic area at a first scale that includes at least a first location and highlights the first location, wherein the first scale is controlled so that the first geographic area includes the first location but does not include a second location; and cause simultaneous display, in the display, of a second map in a second display area wherein the second map displays at least a second geographic area at a second scale that includes the second location and highlights the second location, wherein the second scale is controlled so that the second geographic area includes the second location but does not include the first location.

BRIEF DESCRIPTION

For a better understanding of various examples of embodiments of the present invention reference will now be made by way of example only to the accompanying drawings in which.

DETAILED DESCRIPTION

Figure 1:
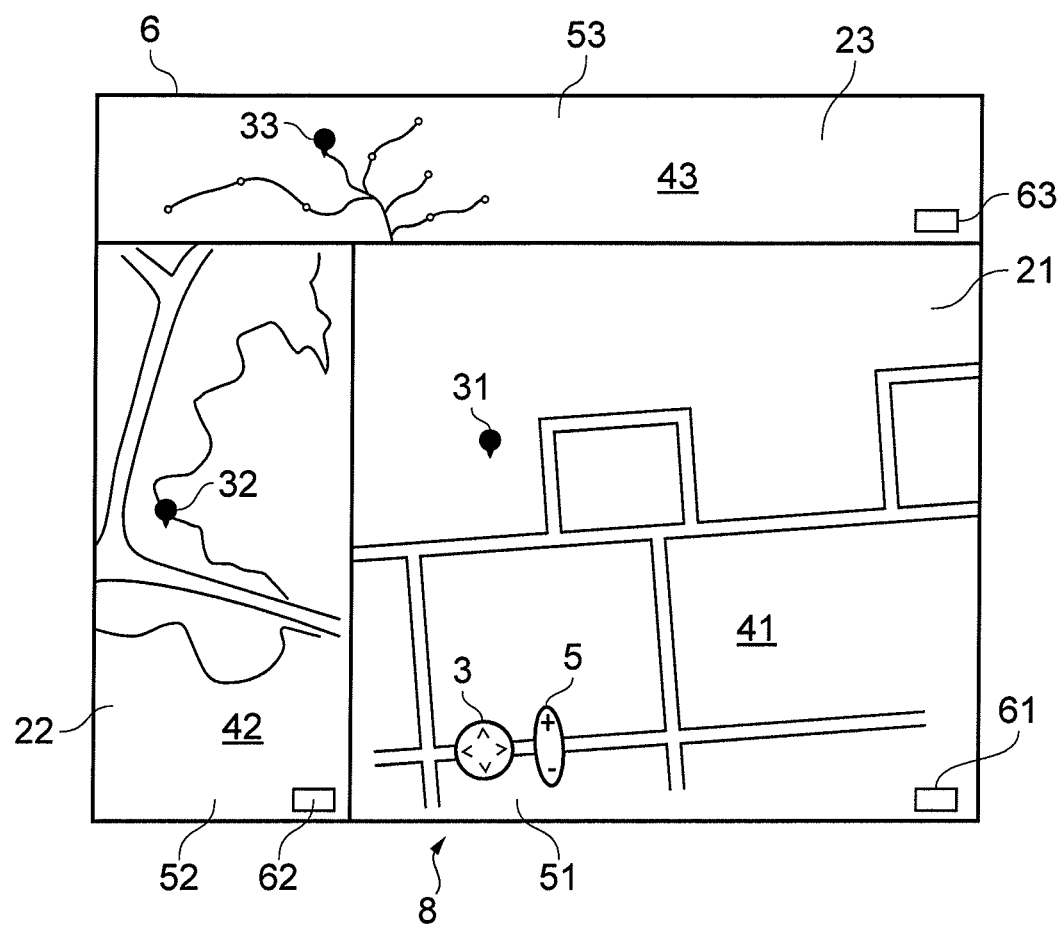
FIGS. 1 and 2 illustrate different examples of a graphical user interface (GUI) comprising simultaneously multiple display areas.
Figure 2:
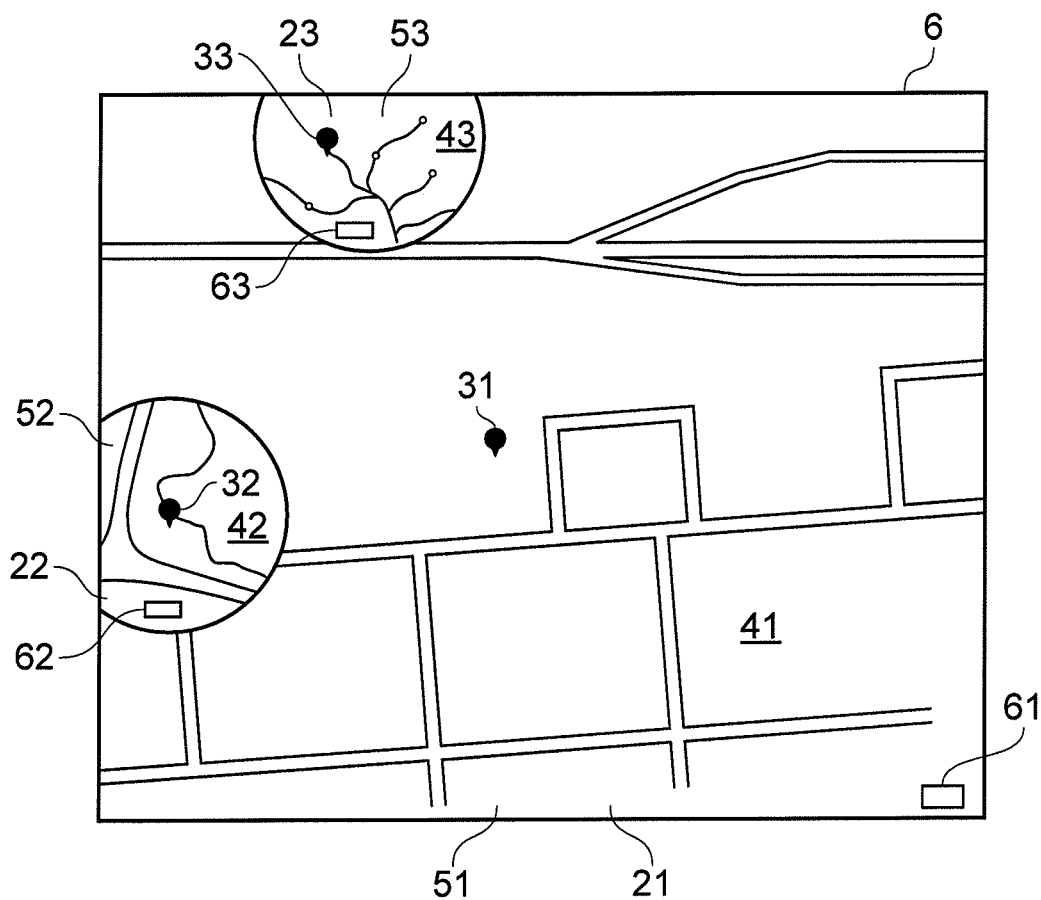

FIGS. 1 and 2 illustrate different examples of a graphical user interface (GUI) comprising simultaneously multiple display areas 21, 22, 23. The GUI is displayed on a display 6 of an apparatus.

A first display area 21 of the display 6 displays a first map 41. The first map 41 represents a first geographic area 51, at a first scale, including a first location 31. The first location 31 is highlighted using, in this example, an icon.

A second display area 22 of the display 6 displays a second map 42. The second map 42 represents a second geographic area 52, at a second scale, including a second location 32. The second location 32 is highlighted using, in this example, an icon.

A third display area 23 of the display 6 displays a third map 43. The third map 43 represents a third geographic area 53, at a third scale, including a third location 33. The third location 33 is highlighted using, in this example, an icon.

The first scale is controlled so that the first geographic area 51 includes the first location 31 but does not include the second location 32 nor the third location 33.

The second scale is controlled so that the second geographic area 52 includes the second location 32 but does not include the first location 31 nor the third location 33.

The third scale is controlled so that the third geographic area 53 includes the third location 33 but does not include the first location 31 nor the second location 32.

In the illustrated examples, none of the geographical areas are a sub-area of another one of the geographical areas. The first geographic area 51 does not lie wholly within the second geographic area 52 nor the third geographic area 53, the second geographic area 52 does not lie wholly within the first geographic area 51 nor the third geographic area 53, and the third geographic area 53 does not lie wholly within the first geographic area 51 nor the second geographic area 52.

In the illustrated examples, none of the geographical areas overlap. The first geographic area 51 does not lie within any of the second geographic area 52 nor the third geographic area 53, the second geographic area 52 does not lie within any of the first geographic area 51 nor the third geographic area 53, and the third geographic area 53 does not lie within any of the first geographic area 51 nor the second geographic area 52.

In the illustrated examples, multiple locations distributed over a large geographic area are displayed simultaneously by displaying separately the local geographic areas associated with each location.

In the example of FIG. 1, the first display area 21, the second display area 22 and the third display area 23 are contiguous tiles that form a mosaic of display areas. A 'mosaic' is this sense is an arrangement of two-dimensional areas (tiles) that do not overlap and without gaps between the areas (tiles). Each pairing of adjacent areas (tiles) touch along a continuous (unbroken) interface. In the example of FIG. 2, the first display area 21 is the main image with the second display area 22 and the third display area 23 presented as peripheral images that overlap the main image. The first display area 21 may be considered to be a foreground image with the second display area 22 and the third display area 23 representing openings through that image to images of their respective maps. In this example the openings are circular or a part of a circle.

Figure 7:
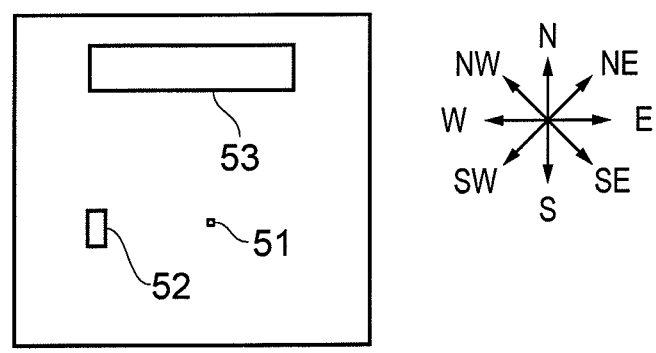
FIG. 7 is a schematic illustration of a notional very large scale map that comprises multiple first geographic areas.

FIG. 7 is a schematic illustration of a notional very large scale map that comprises the first geographic area 51, the second geographic area 52 and the third geographic area 53 at the same scale. The described GUI may avoid displaying this notional large scale map by instead displaying the three display areas 21-23.

In an example, the relative scalings used for the respective display areas 21, 22, 23 are apparent from the size of the boxes used in the figure to demarcate the respective geographical areas 51-53.

The relative positions of the respective geographic areas 51, 52, 53 and the distances between them are also apparent from the figure.

Referring to FIGS. 1 and 2, the display areas 21, 22, 23 share common characteristics which may vary from display area to display area.

The positional relationship between the first geographic area 51, the second geographic area 52 and the third geographic area 53 may be indicated in the display 6 by differing values of one or more of the common characteristics for the display areas 21, 22, 23.

For example, a common characteristic of the display areas 21-23 that may be used (e.g. FIGS. 1 & 2) to indicate the relative positions of the geographic areas 51-53 is the respective positions of the display areas within the display. This affects the layout of the display areas 21-23 in the display 6.

Each of eight compass bearings {North (N), North-East (NE), East (E), South-East (SE), South (S), South-West (SW), West (W), and North-West (NW)} may be associated with one of eight relative positions in the display {Up, Up-Right, Right, Down-Right, Down, Down-Left, Left, Up-Left}.

In an example, a relative positioning of the second display area 22 and the first display area 21 in the display 6 (see FIGS. 1 & 2) is indicative of and dependent on a compass bearing from the first geographic area 51 to the second geographic area 52 (see FIG. 7). In FIG. 7, the second geographic area 52 is closest to the compass bearing West (W) when measured from the first geographic area 51. Consequently the second display area 22 is positioned leftwards of the first location 31 in the first display area 21 in the display 6.

In an example, a relative positioning of the first display area 21 and the third display area 23 in the display 6 (see FIGS. 1 & 2) is indicative of and dependent on a compass bearing from the first geographic area 51 to the third geographic area 53 (see FIG. 7). In FIG. 7, the third geographic area 53 is closest to the compass bearing North (N) from the first geographic area 51 and consequently the third display area 23 is positioned upwards of the first location 31 of the first display area 21.

For example, a common characteristic of the display areas 21-23 that may be used (e.g. FIGS. 1 & 2) to indicate the relative positions of the geographic areas 51-53 is the scaling (magnification) of the display areas within the display. Scaling is a measure of a relationship between a distance measured between two points in a geographic area to an equivalent distance measured in the display between the same two points when the display displays the geographic area. Increasing the scale is equivalent to zooming-out (reducing magnification). Decreasing the scale is equivalent to zooming-in (increasing magnification).

A relative scaling of the second display area 22 and the first display area 21 in the display 6 (see FIGS. 1 & 2) is indicative of and dependent upon a difference in distance from a reference location to the first location 31 in the first geographic area 51 and from the reference location to the second location 32 in second geographic area 52. In these examples, the distance from the reference location to the first location 31 in the first geographic area 51 is less than the distance from the reference location to the second location 32 in second geographic area 52 and the first display area 21 has a smaller scale (greater magnification) than the second display area 22.

A relative scaling of the third display area 23 and the first display area 21 in the display 6 (see FIGS. 1 & 2) is indicative of and dependent on a difference in distance from the reference location to the third location 33 in the third geographic area 53 and from the reference location to the first location 31 in the first geographic area 51. In this example, the distance from the reference location to the first location 31 in the first geographic area 51 is less than the distance from the reference location to the third location 33 in third geographic area 53 and the first display area 21 has a smaller scale (greater magnification) than the third display area 23.

Additionally, in this example a relative scaling of the second display area 22 and the third display area 23 in the display 6 (see FIGS. 1 & 2) is indicative of a difference in distance from the reference location to the second location 32 in the second geographic area 52 and from the reference location to the third location 33 in the third geographic area 53. In this example, the distance from the reference location to the second location 32 in the second geographic area 52 is less than the distance from the reference location to the third location 33 in third geographic area 53 and the second display area 22 has a smaller scale (greater magnification) that the third display area 23.

The reference location may, for example, be the location of the apparatus 2 displaying the GUI. Alternatively, the reference location may be another location such as, for example, the first location 31 in the first display area 21.

As another example, a common characteristic of the display areas 21-23 that may be used (e.g. FIG. 1) to indicate the relative positions of the geographic areas 51-53 is the respective sizes of the display areas within the display. In some embodiments size may be equivalent to a surface area, in other embodiments size may be a measure of a maximum dimension or a measure of a perimeter.

A relative sizing of the second display area 22 and the first display area 21 in the display 6 (see FIG. 1) may be indicative of a difference in distance from a reference location to the first location 31 in the first geographic area 51 and from the reference location to the second location 32 in the second geographic area 52. In this example, the distance from the reference location to the first location 31 in the first geographic area 51 is less than the distance from the reference location to the second location 32 in second geographic area 52 and the first display area 21 has a greater size than the second display area 22.

A relative sizing of the third display area 23 and the first display area 21 in the display 6 (see FIG. 1) may be indicative of a difference in distance from the reference location to the third location 33 in the third geographic area 53 and from the reference location to the first location 31 in the first geographic area 51. In this example, the distance from the reference location to the first location 31 in the first geographic area 51 is less than the distance from the reference location to the third location 33 in third geographic area 53 and the first display area 21 has a larger size than the third display area 23.

Additionally, in this example a relative sizing of the second display area 22 and the third display area 23 in the display 6 (see FIG. 1) is indicative of a difference in distance from the reference location to the second location 32 in the second geographic area 52 and from the reference location to the third location 33 in the third geographic area 53. In this example, the distance from the reference location to the second location 32 in the second geographic area 52 is less than the distance from the reference location to the third location 33 in the third geographic area 53 and the second display area 22 has a greater size than the third display area 23.

In a further example, a common characteristic of the display areas 21-23 that may be used to indicate the relative positions of the geographic areas 51-53 is the resolution (sharpness) of the display areas within the display.

Resolution in this sense means the ability of the human eye to resolve different elements in an image displayed in a display area and is a measure of how the display is used to display the image rather than a measure of the pixel density of the display. Resolution in this sense is synonymous with sharpness or focus and different resolution may be achieved by filtering images before display.

A relative resolution of the second display area 22 and the first display area 21 in the display 6 (see FIG. 1) may be indicative of a difference in distance from a reference location to the first location 31 in the first geographic area 51 and from the reference location to the second location 32 in second geographic area 52. For example, the distance from the reference location to the first location 31 in the first geographic area 51 is less than the distance from the reference location to the second location 32 in second geographic area 52 and the first display area 21 may therefore have a greater resolution (sharpness) than the second display area 22.

A relative resolution of the third display area 23 and the first display area 21 in the display 6 (see FIG. 1) may be indicative of a difference in distance from the reference location to the third location 33 in the third geographic area 53 and from the reference location to the first location 31 in the first geographic area 51. In this example, the distance from the reference location to the first location 31 in the first geographic area 51 is less than the distance from the reference location to the third location 33 in third geographic area 53 and the first display area 21 could have a greater resolution (sharpness) than the third display area 23.

Additionally, a relative resolution of the second display area 22 and the third display area 23 in the display 6 (see FIG. 1) may be indicative of a difference in distance from the reference location to the second location 32 in the second geographic area 52 and from the reference location to the third location 33 in the third geographic area 53. For example, the distance from the reference location to the second location 32 in the second geographic area 52 is less than the distance from the reference location to the third location 33 in third geographic area 53 and the second display area 22 could have a greater resolution (sharpness) than the third display area 23.

Alternatively or additionally other visual characteristics that affect the visual appearance of content displayed in a display area may be used. Examples of visual characteristics include resolution (as described above), contrast, brightness and color saturation. One or more different visual characteristics may be used to differentiate the respective display areas and indicate differences in distance from the reference location.

Optionally, a display area 21-23 may have a label 61-63 that, for example, identifies a distance from the reference location to the geographic area 51-53 displayed by that display area 21-23. The label may, for example, indicate a distance in a unit of distance such as, for example, kilometers.

The display areas 21-23 may additionally or alternatively have other labels. Examples of other labels include but are not limited to identifier labels that identify features in a map such as, for example, roads, areas, towns, cities, regions and contextual labels that provide contextual information that may vary with context (e.g. search performed, time, date, etc).

In the illustrated example in FIG. 1, a first label 61 labels a distance of the first location 31 from the reference location. A second label 62 labels a distance of the second location 32 from the reference location. A third label 63 labels a distance of the third location 33 from the reference location.

The graphical user interface may be, for example, used to provide results of a database search. The controller 4 of the apparatus 2 may be configured to enable a database search to find one or more matches to a search criteria.

The search itself may be confined to locations or the controller may be configured to detect when the results of a search include locations.

In an example, the search results returned include locations and the results are displayed using the above-described graphical user interface by indicating the locations using one or more display areas. Each display area may display one search result (location) or more than one search results (locations).

The relevance of returned locations for a search may be indicated to a user by varying one or more common characteristics of the display areas used for the returned locations and/or by varying a graphical element used to indicate a location.

In an example where the search returns three locations 31, 32, 33 then the graphical user interface may present the results as illustrated in FIG. 1 or 2, for example.

The search may be instigated by a user query or may be instigated automatically by the controller 4 when a particular condition changes, such as the (reference) location of the apparatus 2. In the latter case, the search results may be unprompted recommendations based upon a user's locality.

Each display area 21-23 may be user selectable to provide a user input command to the controller 4 or may comprise one or more user selectable elements that provide, when selected, user input commands to the controller 4.

For example, the display 6 may be a touch-sensitive display which provides user input 8 as well as the display 6. Input may be provided to the touch sensitive display by touching the display with a digit and/or by tracing a digit across the display. When a user traces a digit across the display 6 from the first display area 21 to the second display area 22, then the controller 4 may determine a route from the first geographic area 51 to the second geographic area 52. The route may be between the first location 31 and the second location 32. The first location may correspond to the user's current location.

For example, selecting one of the simultaneously displayed display areas 21-23 may result in the exclusive display of the geographic area associated with the selected display area but in a larger display area and at a smaller scale (greater magnification). Thus, if the second display area 22 were selected in FIG. 1, the display areas 21-23 would cease to be displayed but a new display area, larger than any of the previous display areas 21-23, would be displayed and would include the second geographic area but at a smaller scale (larger magnification).

For example, selecting one of the icons indicating a location 31-33 displayed in display areas 21-23 may result in the display of a pop-up screen that provides further information about that location.

The graphical user interface, in the example of FIG. 1, provides as user inputs 8, a panning user input 3 and a magnification (scaling) user input 5.

The panning user input operates like a joy-stick to allow panning (scrolling) of the first geographical area through the first display area 21.

The magnification user input operates like a roller switch to allow increasing magnification (zoom-in) by selecting + and decreasing magnification (zoom-out) by selecting –.

When a user changes the first scale of the first display area 21 such that the first geographic area 51 at the new first scale includes the first location 31 and the second location 32, then the layout of the graphical user interface may be rearranged. The controller 4 may cause the graphical user interface to cease displaying, in the display 6, the first display area 21 and the second display area 22. These areas may be replaced by a combined display area. In this instance, the controller 4 may cause display, in the display 6, of a new map in the combined display area wherein the combined map displays a combined geographic area at a scale that includes the first location 31 and the second location 32 and causes highlighting of the first location 31 and the second location 32.

Figure 6:
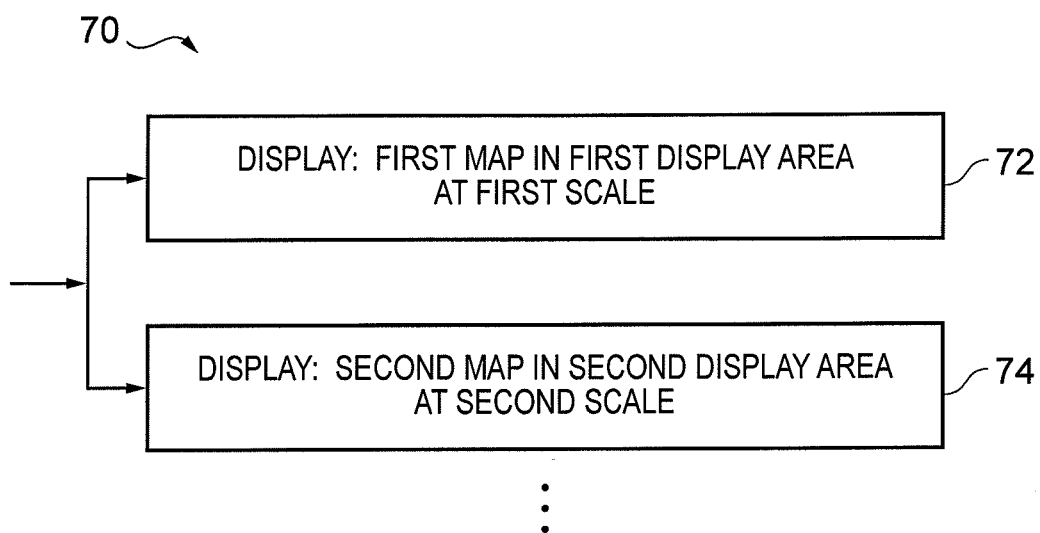
FIG. 6 illustrates a method.

FIG. 6 illustrates a method 70. The method may be a method for controlling a display 6, for example, to display the previously described graphical user interface (GUI).

At block 72, a first map 41 is displayed in a first display area 21. The first map 41 displays a first geographic area 51 at a first scale that includes a first location 31 and highlights the first location 31. The first scale is controlled so that the first geographic area 51 includes the first location 31 but does not include a second location 32.

At block 72, a second map 42 is displayed in a second display area 22. The second map 42 displays a second geographic area 52 at a second scale that includes a second location 32 and highlights the second location 32. The second scale is controlled so that the second geographic area 52 includes the second location 32 but does not include the first location 31.

In some embodiments, a controller 4 (FIGS. 3 & 4) may cause display, in the display 6, of the first display area 21 as previously described and may control the first scale. The controller 4 (FIGS. 3 & 4) may also cause display, in the display 6, of the second display area 22 as described and may control the second scale. In some embodiments the first display area 21 and the second display area 22 are displayed simultaneously as illustrated in FIGS. 1 and 2.

Additional blocks may be added to the method. At each additional block, a further map is displayed in a further display area. The further map displays a further geographic area at a particular scale that includes a further location and highlights the further location. In some examples, the scales of the display areas are controlled so that each display area comprises a unique area that is exclusive to that display area.

As previously described, the display areas may be differentiable using one or more of the following parameters: position within the display, size, resolution and scale. A positional relationship between the first geographic area 51 and the second geographic area 52 may be indicated by differing values of at least one of the parameters for the first display area 21 and the second display area 22.

For example, a compass bearing between the first geographic area 51 and the second geographic area 52 may be indicated using relative positioning of the first display area 21 and the second display area 22 in the display 6.

As another example, a distance from a reference location to the first geographic area 51 may be indicated using the first scaling and a distance from the reference location to the second geographic area 52 may be indicated using the second scaling.

Figure 3:
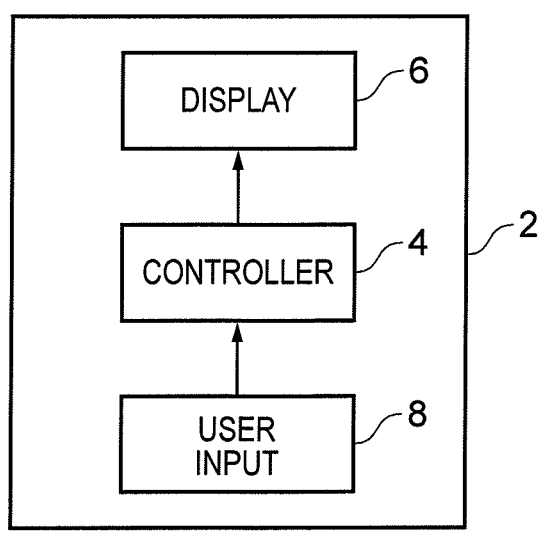
FIG. 3 illustrates an example of an apparatus that may be used to provide the graphical user interface.

FIG. 3 illustrates an example of an apparatus 2 that may be used to enable the above described graphical user interface and methods.

The apparatus 2 comprises a controller 4, the display 6 and a user input 8. The controller 4 is configured to receive commands from the user input 8 and provide commands to the display 6. The controller 4 is operationally coupled to the display 6 and operationally coupled to the user input 8. Operationally coupled means that any number or combination of intervening elements can exist (including no intervening elements).

In this example, the display 6 and user input 8 are integrated into the apparatus 2. The apparatus 2 is a user apparatus for use by a user.

However, in other embodiments one or both may be peripheral devices connected externally to the apparatus 2. In this example, the apparatus 2 may be a module for integration into a user apparatus 2.

Examples of user apparatus 2 include mobile cellular telephones, personal computers, personal media devices, personal digital assistants, tablet computers, etc.

The user apparatus 2 may be portable. The user apparatus 2 may, for example, be a hand-portable apparatus 2. A hand-portable apparatus is an apparatus sized to be used while held in one hand. It may, for example, be sized to rest in a palm of a hand or fit within a breast jacket pocket.

Implementation of controller can be in hardware alone (a circuit, a processor etc), have certain aspects in software including firmware alone or can be a combination of hardware and software (including firmware).

The controller 4 may be implemented using instructions that enable hardware functionality, for example, by using executable computer program instructions in a general-purpose or special-purpose processor that may be stored on a computer readable storage medium (disk, memory etc) to be executed by such a processor.

Figure 4:
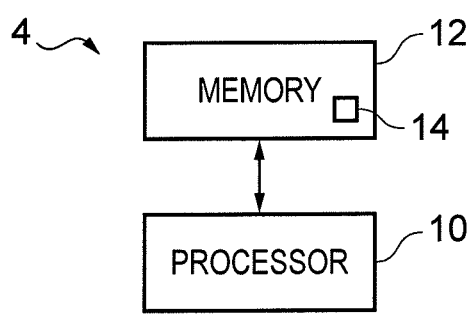
FIG. 4 illustrates an example of a controller.

FIG. 4 illustrates an example of a controller 4. The processor 10 is configured to read from and write to the memory 12. The processor 10 may also comprise an output interface via which data and/or commands are output by the processor 10 and an input interface via which data and/or commands are input to the processor 10.

The memory 12 stores a computer program 14 comprising computer program instructions that control the operation of the apparatus 2 when loaded into the processor 10. The computer program instructions 14 provide the logic and routines that enables the apparatus to perform the methods illustrated in FIG. 6 and to provide the graphical user interface described above. The processor 10 by reading the memory 12 is able to load and execute the computer program 14.

An example apparatus therefore comprises: at least one processor 10; and at least one memory 12 including computer program code 14, the at least one memory 12 and the computer program code 14 configured to, with the at least one processor 10, cause the apparatus 2 at least to perform: causing display, in a first display area 21 of a display 6, of a first map 41 that represents, at a first scale, a first geographic area 51 including a first location 31 and that highlights the first location 31, wherein the first scale is controlled so that the first geographic area 51 includes the first location 31 but does not include a second location 32; and
causing simultaneous display, in a second different display area of the display 6, of a second map 42 that represents, at a second scale, a second geographic area 52 including the second location 32 and that highlights the second location 32, wherein the second scale is controlled so that the second geographic area 52 includes the second location 32 but does not include the first location 31.

Figure 5:
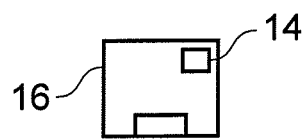
FIG. 5 illustrates a delivery mechanism for a computer program.

As illustrated in FIG. 5, the computer program 14 may arrive at the apparatus 2 via any suitable delivery mechanism 16. The delivery mechanism 16 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 14. The delivery mechanism may be a signal configured to reliably transfer the computer program 14. The apparatus 2 may propagate or transmit the computer program 14 as a computer data signal.

Although the memory 12 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also include an implementation of merely a processor (or multiple processors) or portion of a processor and its (or their) accompanying software and/or firmware. The term "circuitry" would also include, for example and if applicable to the particular claim element, a baseband integrated circuit or applications processor integrated circuit for a mobile phone or a similar integrated circuit in server, a cellular network device, or other network device.

As used here 'module' refers to a unit or apparatus that excludes certain parts/components that would be added by an end manufacturer or a user.

The blocks illustrated in the FIG. 6 may represent steps in a method and/or sections of code in a computer program. The illustration of a particular order to the blocks does not necessarily imply that there is a required or preferred order for the blocks and the order and arrangement of the blocks may be varied. Furthermore, it may be possible for some blocks to be omitted.

It will be appreciated from the foregoing that some but not necessarily all embodiments of the invention provide an apparatus comprising: means for causing display, in a display, of a first map in a first display area wherein the first map displays a first geographic area at a first scale that includes at least a first location and highlights the first location, wherein the first scale is controlled so that the first geographic area includes the first location but does not include a second location; and means for causing simultaneous display, in the display, of a second map in a second display area wherein the second map displays at least a second geographic area at a second scale that includes the second location and highlights the second location, wherein the second scale is controlled so that the second geographic area includes the second location but does not include the first location.

It will be appreciated from the foregoing that some but not necessarily all embodiments of the invention provide an apparatus comprising: means for displaying a first map in a first display area wherein the first map displays a first geographic area at a first scale that includes at least a first location and highlights the first location, wherein the first scale is controlled so that the first geographic area includes the first location but does not include a second location; and means for displaying a second map in a second display area wherein the second map displays at least a second geographic area at a second scale that includes the second location and highlights the second location, wherein the second scale is controlled so that the second geographic area includes the second location but does not include the first location.

Although embodiments of the present invention have been described in the preceding paragraphs with reference to various examples, it should be appreciated that modifications to the examples given can be made without departing from the scope of the invention as claimed. For example, although the first display area 21, the second display area 22 and the third display area 23 are illustrated as having certain shapes they may have other shapes. In FIG. 1, the display areas are rectangular. In FIG. 2, the first display area 21 is rectangular but the second display area 22 and the third display area are not rectangular but are circular. In an alternative embodiment to FIG. 2, the second display area 22 and the third display area may be shaped like jig-saw pieces, that is, they may be for example substantially rectangular with each edge having a curved tenon (tab) or curved mortice (recess).

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   at least one processor; and
   at least one memory including computer program code,
   the at least one memory and the computer program code configured to, with the at least one processor, cause the apparatus at least to perform:
   causing display, in a first display area of a display, of a first map that represents, at a first scale, a first geographic area including at least a first location and that highlights the first location, wherein the first map is caused to be displayed at the first scale so that the first geographic area includes the first location but does not include a second location; and
   causing simultaneous display, in a second different display area of the display, of a second map that represents, at a second scale different than the first scale, a second geographic area including at least the second location and that highlights the second location, wherein the second map is caused to be displayed at the second scale so that the second geographic area includes the second location but does not include the first location;
   wherein the first scale of the first display area is dependent on a difference in distance from a reference location to the first geographic area and the second scale of the second display area is dependent on a difference in distance from the reference location to the second geographic area,
   wherein the first and second maps are caused to be displayed such that the first geographic area does not lie within any of the second geographic area and the second geographic area does not lie within any of the first geographic area,
   wherein the first and second maps are caused to be displayed without display of a geographic area between the first and second geographic areas, and
   wherein the first display area and the second display area are displayed simultaneously in response to a database search that returns as results the first display area and the second display area.

2. An apparatus as claimed in claim 1, wherein the first display area and the second display area share common characteristics and a positional relationship between the first geographic area and the second geographic area is indicated by differing values of at least one of the common characteristics for the first display area and the second display area.

3. An apparatus as claimed in claim 2, wherein the common characteristics of the first display area and the second display area comprise: a position within the display, size, resolution and scale.

4. An apparatus as claimed in claim 1, wherein a relative positioning of the first display area and the second display area in the display is dependent on a compass bearing between the first geographic area and the second geographic area.

5. An apparatus as claimed in claim 1, wherein a relative sizing of the first display area and the second display area is dependent on a difference in distance from a reference location to the first geographic area and from the reference location to the second geographic area.

6. An apparatus as claimed in claim 1, wherein one or more visual characteristics of content in the first display area and the second display area are dependent on a difference in distance from a reference location to the first geographic area and from the reference location to the second geographic area.

7. An apparatus as claimed in claim 1, wherein the reference location is a current location of the apparatus.

8. An apparatus as claimed in claim 1, wherein the reference location is the first location.

9. An apparatus as claimed in claim 1, wherein a distance from a reference location to the first geographic area labels the first display area and a distance from the reference location to the second geographic area labels the second display area.

10. An apparatus as claimed in claim 1, wherein the first display area and the second display area are contiguous tiles and form a whole or part of a mosaic of display areas.

11. An apparatus as claimed in claim 1, wherein at least one of the first display area and the second display area is user selectable, wherein user selection of the at least one user selectable display area generates a command that is dependent upon whether the at least one selectable display area is the first display area or the second display area.

12. An apparatus as claimed in claim 1, wherein a user control is presented for changing the first scale and wherein the at least one memory and the computer program code are configured to, with the at least one processor, cause the apparatus at least to perform:
   when a user changes the first scale to a new scale such that the first geographic area at the new scale includes the first location and the second location,
   ceasing display, in the display, of the first map in the first display area;
   ceasing display, in the display, of the second map in the second display area; and causing display, in the display, of a replacement map in a new display area wherein the replacement map displays a geographic area at a scale that includes the first location and the second location and highlights the first location and the second location.

13. A method comprising:
causing display, in a display, of a first map in a first display area wherein the first map displays a first geographic area at a first scale that includes at least a first location and highlights the first location, wherein the first map is caused to be displayed at the first scale so that the first geographic area includes the first location but does not include a second location; and
causing simultaneous display, in the display, of a second map in a second display area wherein the second map displays at least a second geographic area at a second scale, different than the first scale, that includes the second location and highlights the second location, wherein the second map is caused to be displayed at the second scale so that the second geographic area includes the second location but does not include the first location;
wherein the first scale of the first display area is dependent on a difference in distance from a reference location to the first geographic area and the second scale of the second display area is dependent on a difference in distance from the reference location to the second geographic area,
wherein the first and second maps are caused to be displayed such that the first geographic area does not lie within any of the second geographic area and the second geographic area does not lie within any of the first geographic area,
wherein the first and second maps are caused to be displayed without display of a geographic area between the first and second geographic areas, and
wherein the first display area and the second display area are displayed simultaneously in response to a database search that returns as results the first display area and the second display area.

14. A method as claimed in claim 13, wherein the first display area and the second display area are differentiable using one or more of the following parameters: position within the display, size, resolution and scale and wherein a positional relationship between the first geographic area and the second geographic area is indicated by differing values of at least one of the parameters for the first display area and the second display area.

15. A method as claimed in claim 13, comprising: indicating a compass bearing between the first geographic area and the second geographic area using relative positioning of the first display area and the second display area in the display.

16. A method as claimed in claim 13, comprising: indicating a distance from the reference location to the first geographic area using the first scale; and
indicating a distance from the reference location to the second geographic area using the second scale.

17. A method as claimed in claim 13, further comprising, when a user performs a trace on the display from the first display area to the second display area, determining a route from the first geographic area to the second geographic area.

18. A non-transitory computer program product tangibly embodied on a record carrier that when run on a processor enables the processor to
cause display, in a display, of a first map in a first display area wherein the first map displays a first geographic area at a first scale that includes at least a first location and highlights the first location, wherein the first map is caused to be displayed at the first scale so that the first geographic area includes the first location but does not include a second location; and
cause simultaneous display, in the display, of a second map in a second display area wherein the second map displays at least a second geographic area at a second scale, different than the first scale, that includes the second location and highlights the second location, wherein the second map is caused to be displayed at the second scale so that the second geographic area includes the second location but does not include the first location;
wherein the first scale of the first display area is dependent on a difference in distance from a reference location to the first geographic area and the second scale of the second display area is dependent on a difference in distance from the reference location to the second geographic area,
wherein the first and second maps are caused to be displayed such that the first geographic area does not lie within any of the second geographic area and the second geographic area does not lie within any of the first geographic area,
wherein the first and second maps are caused to be displayed without display of a geographic area between the first and second geographic areas, and
wherein the first display area and the second display area are displayed simultaneously in response to a database search that returns as results the first display area and the second display area.

* * * * *